Patented Jan. 5, 1954

2,665,303

UNITED STATES PATENT OFFICE 2,665,303

ESTERS OF GAMMA-KETOPIMELIC ACID

Harry R. Gamrath, St. Louis, Mo., assignor to Monsanto Chemical Company, St. Louis, Mo., a corporation of Delaware No Drawing. Application July 28, 1949,
Serial No. 107,370

10 Claims. (Cl. 260—483)

This invention relates to esters of gamma-ketopimelic acid having the formula:

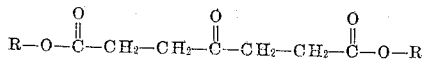

wherein R represents a radical selected from the group consisting of alkyl radicals containing from 4 to 12 carbon atoms and beta-alkoxyethyl radicals wherein the alkyl substituent contains from 1 to 8 carbon atoms.

The novel esters of gamma-ketopimelic acid of this invention range in appearance from essentially colorless or pale yellow, mobile liquids to relatively low melting solids. They have been found to have exceptional utility as plasticizers for various natural and synthetic resins, and in particular polyvinyl chloride resins and copolymers containing predominantly combined vinyl chloride as exemplified by copolymers containing 85-95% by weight of vinyl chloride and 5-15% by weight of vinyl acetate, vinylidine chloride, dimethyl maleate, dimethyl fumarate or methyl methacrylate.

Various procedures may be utilized in preparing the novel compounds of this invention. Preferably, however, they are prepared by reacting a 1 molecular proportion of a compound selected from the group consisting of gamma-ketopimelic acid dilactone and gamma-ketopimelic acid with approximately 2 molecular proportions of an alcohol selected from the group consisting of alkyl alcohols containing from 4 to 12 carbon atoms and beta-alkoxyethyl alcohols wherein the alkyl substituent contains from 1 to 8 carbon atoms in the presence of catalytic quantities of an acid catalyst at a temperature in the range of from about 100° to 175° C., while removing by distillation the water of esterification formed. The esters prepared in this manner may be purified by any of the commonly used methods well known to those skilled in the art of the purification of esters. Typical of the acid catalysts which may be used in the above-described reaction are sulfuric acid, toluene sulfonic acid and benzene sulfonic acid. To facilitate the removal of the water of esterification, various entrainers, such as, butanol, benzene, toluene, xylene, chlorobenzene, gasoline fractions and other water immiscible materials may be used. If in the above-described process for the preparation of the novel esters of gamma-ketopimelic acid of this invention there is used a 2 molecular proportion of a mixture of the alcohols previously described in place of a 2-molecular proportion of an alcohol, there is obtained a mixture of esters, including symmetrical and mixed esters. This mixture of esters may be separated into its several components by fractional distillation or the mixture itself utilized as a plasticizer for various synthetic resins.

Typical of the novel esters of this invention are the dibutyl, di-sec.-butyl, diisobutyl, dipentyl, dihexyl, di-2-methylpentyl, diheptyl, di-octyl, diisooctyl, di-2-ethylhexyl, dicapryl, dinonyl, didecyl, dimethylheptyl, diundecyl, dilauryl, dimethoxyethyl, diethoxyethyl, dipropoxyethyl, dibutoxyethyl, dipentoxyethyl, diethoxyethyl, di-2-methylpentoxyethyl, diheptoxyethyl, dioctoxyethyl, di-2-ethylhexoxyethyl and di-6-methylpentoxyethyl esters of gamma-ketopimelic acid. The alkyl radicals in the novel esters of this invention may be cyclic as well as acyclic, as for example dicyclohexyl gamma-ketopimelate. The alkyl radicals may also contain various substituents, such as aryl groups as exemplified by dibenzyl gamma-ketopimelate.

The following examples are illustrative of the manner of preparation of the novel esters of this invention and their physical properties:

EXAMPLE I

*Di-n-butyl gamma-ketopimelate*

The esterification reactor was charged with 78.0 g. (0.5 mol) of gamma-ketopimelic acid dilactone (M. P. 64-65° C.), 272 g. butanol and 1.0 g. p-toluene sulfonic acid. A conventional esterification setup was used consisting of a reaction flask, an agitator, a thermometer, a fractionating column and a water separator into which the binary, butanol-water, was collected. Wet butanol from the separator was returned to the esterification flask while the aqueous layer was withdrawn and discarded.

The esterification was completed in a heating period of approximately 5 hours. Thereafter, the excess butanol was removed by distillation under reduced pressure. The ester was then washed with 100 cc. of water neutralized with sodium bicarbonate and then the ester was steamed to remove the residual butanol. After additional water washes, the ester was dried by heating under reduced pressure.

From the quantity of ketopimelic acid dilactone charged, a yield of 139.6 g. of di-n-butyl gamma-ketopimelate was obtained. This weight of ester represents a yield of 97.6% of the theoretical.

PROPERTIES OF ESTER

Specific gravity at 25°/25° C _____ 1.0166
$N_D^{25°}$ _____ 1.443

EXAMPLE II

Di-n-amyl gamma-ketopimelate

To the same reactor system as described in Example I was charged 78 g. (0.5 mol) gamma-ketopimelic acid dilactone, 110 g. (1.25 mol) of n-amyl alcohol, 150 cc. toluene and 0.5 g. p-toluene sulfonic acid. The esterification reaction was finished on stirring the reaction mass for about 3.5 hours at about 120–130° C., removing the water of esterification by means of the toluene. The excess solvent was then distilled from the reaction mass and the ester was washed once with 100 cc. of water neutralized with sodium bicarbonate. Then the ester was steamed to remove the remaining toluene and alcohol, and after washing the ester again with water, the product was dried by heating under reduced pressure.

The yield of di-n-amyl gamma-ketopimelate was 152.0 g. or 96.8% of the theoretical value based on the dilactone.

PROPERTIES OF ESTER

Specific gravity at 25°/25° C _____ 0.9969
$N_D^{25°}$ _____ 1.445

EXAMPLE III

Dicapryl gamma-ketopimelate

Employing the same esterification setup as described under Example I, the reactor was charged with 78 g. (0.5 mol) of gamma-ketopimelic acid dilactone, 143 g. (1.1 mols) capryl alcohol (2-octanol), 1.0 g. p-toluene sulfonic acid and 200 cc. of toluene. The reaction mass was heated and agitated for 10 hours at 129–132° C. and then the excess solvent was removed under reduced pressure. After cooling, the ester was washed with water made alkaline to litmus paper with sodium bicarbonate. Thereafter, the ester was washed twice with water and then steamed to remove the residual solvent. After steaming, the ester was dried by heating under reduced pressure.

From the charges listed, there was obtained 103.5 g. of dicapryl gamma-ketopimelate, or a yield of 52.0% based on the gamma-ketopimelic acid dilactone.

PROPERTIES OF ESTER

Specific gravity at 25°/25° C _____ 0.9512
$N_D^{25°}$ _____ 1.445

EXAMPLE IV

Di(2-ethylhexyl) gamma-ketopimelate

To the reactor of the same esterification setup as described under Example I was charged 78 g. (0.5 mol) of gamma-ketopimelic acid dilactone, 130 g. (1.0 mol) of 2-ethylhexanol, 1.0 g. p-toluene sulfonic acid and 200 cc. of toluene. The esterification was completed by stirring and heating the reaction mass at 123–128° C. for 7 hours. The toluene was then removed by distillation under reduced pressure. Next the ester was washed with water neutralized with sodium bicarbonate. To remove the residual toluene, the ester was then steamed. After steaming, the ester was dried by heating under reduced pressure.

The yield of di(2-ethylhexyl) gamma-ketopimelate was 189.3 g. or 95.1% of the theoretical value.

PROPERTIES OF ESTER

Specific gravity at 25°/25° C _____ 0.9633
$N_D^{25°}$ _____ 1.451

EXAMPLE V

Dilauryl gamma-ketopimelate

Using the esterification setup as described under Example I, the reactor was charged with 78 g. (0.5 mol) gamma-ketopimelic acid dilactone, 186 g. (1.0 mol) lauryl alcohol, 1.0 g. p-toluene sulfonic acid and 150 cc. toluene. The esterification was completed by heating and stirring the reaction mass for about 4.5 hours at 132–136° C. Then the toluene was removed by distillation under reduced pressure. Next the ester was washed with water neutralized with sodium bicarbonate. Then the residual toluene was removed from the ester by steaming. After steaming, the ester was dried by heating under reduced pressure.

From the charges listed a yield of 243.6 g. of dilauryl gamma-ketopimelate was obtained or 95.5% of the theoretical value.

The ester was an almost white, waxy solid with a crystallizing point of about 59° C.

EXAMPLE VI

Di(beta-methoxyethyl) gamma-ketopimelate

To the reactor of the esterification setup as described under Example I was charged 117 g. (0.75 mol) of gamma-ketopimelic acid dilactone, 165.5 g. (2.18 mols) of beta-methoxyethanol ("methyl cellosolve"), 1.5 g. p-toluene sulfonic acid and 150 cc. benzene. The reaction mass was heated and stirred for 12 hours, the water of esterification being removed by means of the benzene. Then the benzene and most of the excess "methyl cellosolve" were removed by distillation under reduced pressure. Since the ester is soluble in water, sodium bicarbonate was added to neutralize the catalyst and the mass was fractionated.

The yield of ester boiling at 208–212° C./6 mm. was 159.3 g. or 73.3% of theory based on the dilactone.

PROPERTIES OF ESTER

Specific gravity at 25°/25° C_ 1.1463.
$N_D^{25°}$ _____ 1.452.
Boiling point _____ 208–212° C./6 mm.
Pour point _____ −50° F.
Solubility in water _____ Miscible.
Viscosity in centistokes:
   At 100° F _____ 14.49.
   At 210° F _____ 3.02.
Flash point (C. O. C.) about_ 405° F.
Fire point (C. O. C.) about___ 460° F.

EXAMPLE VII

Di(beta-2-ethylhexoxyethyl) gamma-ketopimelate

To the reactor of the esterification setup as described in Example I was charged 46.8 g. (0.3 mol) of gamma-ketopimelic acid dilactone, 174 g. (1.0 mol) of ethylene glycol mono-2-ethylhexyl ether, 0.7 cc. of 60° Bé. sulfuric acid and 150 cc. of xylene. The reaction mass was heated and stirred for about 5 hours while removing the water of esterification formed, using the xylene as the entraining agent. During this period the reactor temperature ranged from 151 to 156° C. The xylene and some of the excess of ethylene glycol mono-2-ethylhexyl ether were removed by distillation under reduced pressure. The ester was then washed with water and neutralized with sodium bicarbonate. The residual xylene was removed from the ester by steaming. After steaming, the ester was dried by heating under reduced pressure. The dried ester was then fractionated to remove the residual ethylene glycol mono-2-ethylhexyl ether.

From the charge of dilactone given, the yield of distilled di(beta-2-ethylhexoxyethyl) gamma-ketopimelate was 118.1 g. or 81.0% of the theoretical value.

PROPERTIES OF ESTER

Specific gravity at 25°/25° C _____ 0.9797
$N_D^{25°}$ _____ 1.4525

The outstanding utility of the novel compounds of this invention is illustrated by the properties of a polyvinyl chloride composition containing these esters as plasticizers. Compositions were prepared containing 55 parts by weight of a polyvinyl chloride resin formed by the polymerization of vinyl chloride, 40 parts by weight of plasticizer and 5 parts by weight of a basic lead silicate stabilizer. The resin, plasticizer and stabilizer were intimately mixed and fluxed on a differential steel roll mill for about 5 minutes at 160° C. When a homogeneous composition had formed on the roll, the plasticized polyvinyl chloride composition was sheeted off the roll mill. This composition was then molded into a 5" x 5" x .040" sheet under a pressure of 2,000 lbs. per square inch at a temperature of 160° C. Compositions containing dicapryl gamma-ketopimelate or di(2-ethylhexyl) gamma-ketopimelate as plasticizers in the above-described composition were clear, substantially colorless, free from odor and exceptionally flexible, both at room temperature and at reduced temperatures. The low temperature flexibility of these compositions was determined by the method described by Clash and Berg, Ind. Eng. Chem., 34, 1218 (1942). The composition containing dicapryl gamma-ketopimelate had a low temperature flexibility of —46° C., while the composition containing di(2-ethylhexyl) gamma-ketopimelate had a low temperature flexibility of —53° C., thereby indicating an extreme degree of flexibility at very low temperatures. These results are indicative of the general behavior of the esters of gamma-ketopimelic acid of this invention as plasticizers for polyvinyl chloride resins. In view of these properties, plasticized polyvinyl chloride compositions containing the esters of gamma-ketopimelic acid of this invention find utility in a wide variety of applications, typical of which are calendered films, sheeting for wearing apparel, shower curtains, seat and cushion covering, and extruded insulation for electrical wiring.

The di(beta-methoxyethyl) gamma-ketopimelate of this invention is further unique. This 13 carbon atom straight chain ester is completely soluble in water. Aqueous solutions of this ester are excellent paint and varnish removers. When 1 part of this ester is mixed with as much as 2 parts of water, the solution is still quite effective as a paint or varnish remover. Aqueous solutions of the ester containing less than 67% by weight of the ester either do not burn, or ignite with considerable difficulty after a direct flame boils away some of the water. This ester is also a good solvent for cellulose acetate. It is compatible with cellulose nitrate as well as with the heretofore described polyvinyl chloride resins.

What is claimed is:

1. As new chemical compounds, the esters of gamma-ketopimelic acid having the formula

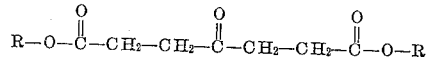

wherein R is selected from the group consisting of alkyl radicals containing at least 4 and not more than 12 carbon atoms and beta-alkoxyethyl radicals wherein the alkyl substituent contains at least 1 and not more than 8 carbon atoms.

2. As new chemical compounds, the dioctyl gamma-ketopimelates.

3. As a new chemical compound, di-(2-ethylhexyl) gamma-ketopimelate.

4. As a new chemical compound, dibutyl gamma-ketopimelate.

5. As a new chemical compound, di(beta-methoxyethyl) gamma-ketopimelate.

6. In a process for the production of esters of gamma-ketopimelic acid having the formula

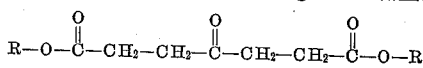

wherein R is selected from the group consisting of alkyl radicals having at least 4 and not more than 12 carbon atoms and alkoxyethyl radicals wherein the alkyl substitutent contains at least 1 and not more than 8 carbon atoms, the steps comprising heating a 1 molecular proportion of a compound selected from the group consisting of gamma-ketopimelic acid dilactone and gamma-ketopimelic acid and approximately 2 molecular proportions of an alcohol selected from the group consisting of alkyl alcohols containing at least 4 and not more than 12 carbon atoms and beta-alkoxyethyl alcohols wherein the alkyl substituent contains at least 1 and not more than 8 carbon atoms, in the presence of catalytic quantities of an acid catalyst, and removing the water of esterification formed.

7. A process as described in claim 6 wherein the alcohol is an octanol.

8. A process as described in claim 6 wherein the alcohol is 2-ethylhexanol.

9. A process as described in claim 6 wherein the alcohol is butanol.

10. A process as described in claim 6 wherein the alcohol is ethylene glycol monomethyl ether.

HARRY R. GAMRATH.

References Cited in the file of this patent

UNITED STATES PATENTS

| Number | Name | Date |
|--------|------|------|
| 1,991,391 | Izard | Feb. 19, 1935 |
| 2,032,679 | Wickert | Mar. 3, 1936 |
| 2,436,532 | Singleton | Feb. 24, 1948 |
| 2,485,281 | Gregory | Oct. 18, 1949 |